May 15, 1956
E. R. WOODWARD
2,745,714
TREATMENT OF ODOR CONTAINING
GASES WITH CHLORINE DIOXIDE
Filed June 5, 1950
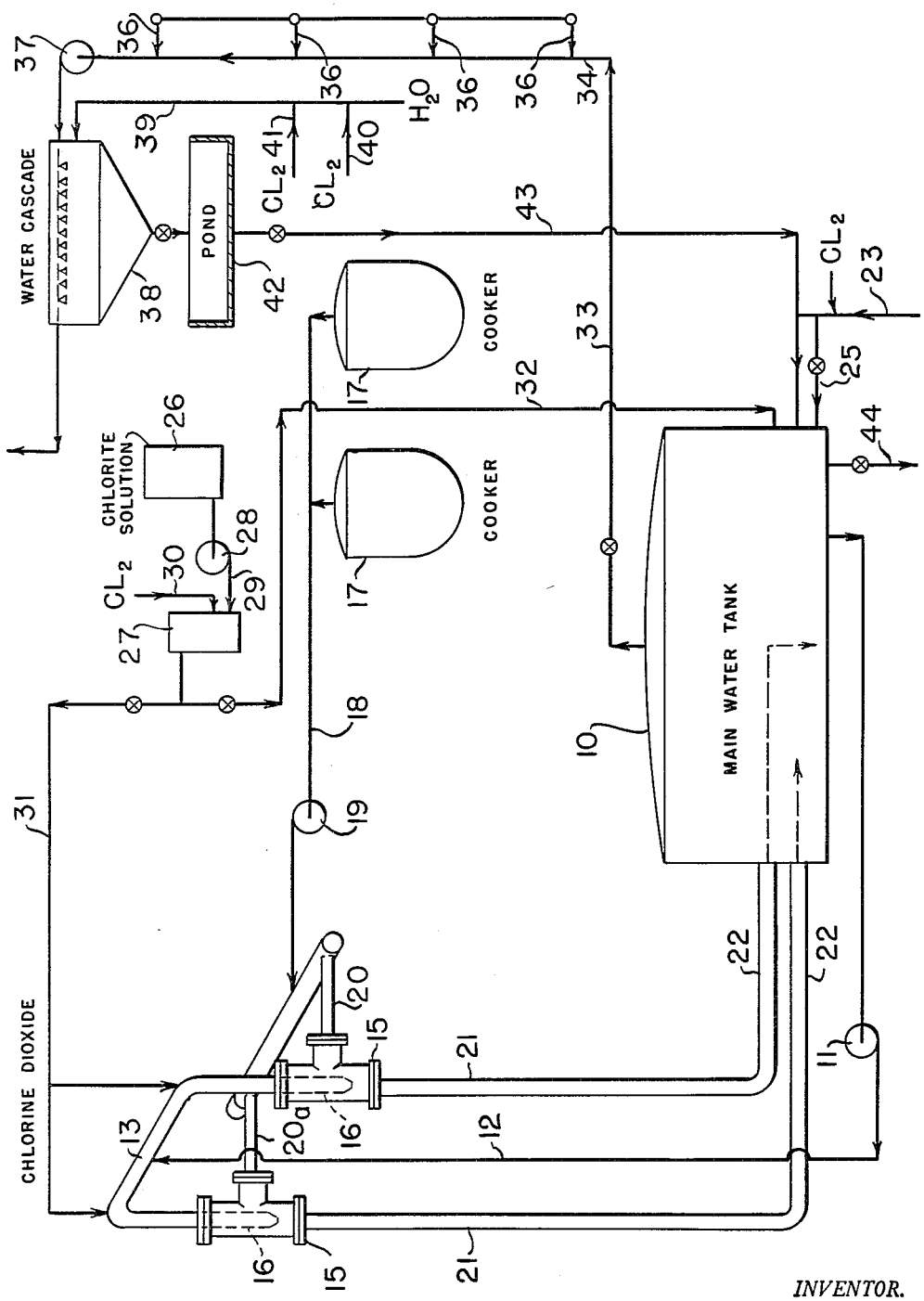
INVENTOR.
Eric R. Woodward
BY
Adams, Forward & McLean
ATTORNEYS

2,745,714

TREATMENT OF ODOR CONTAINING GASES WITH CHLORINE DIOXIDE

Eric R. Woodward, New York, N. Y., assignor to Olin Mathieson Chemical Corporation, a corporation of Virginia Application June 5, 1950, Serial No. 166,116

1 Claim. (Cl. 23—2)

My invention relates to improvements in the control of odors resulting from the processing of organic materials. In the processing of organic materials, for example in soap making or fat rendering, large quantities of odors are evolved in the form of cooking gases which must be disposed of and the plant atmosphere is contaminated in various phases of processing and materials handling. The discharge of the process and plant vapors into the open atmosphere creates an odor problem which is becoming increasingly serious as public health authorities are becoming more and more active in regulating this phase of atmospheric pollution.

Many proposals have been made and schemes devised for deodorizing the offensive organic odors, ranging from simply collecting the vapors and burning them under the plant boilers to chemical scrubbing and chlorinating methods. Burning the vapors reduces the efficiency of boiler operations so that it is too costly in terms of fuel requirements and fails to satisfactorily eliminate the problem. Chlorination has not been successful as is shown by the many fat rendering plants where chlorinators have been installed but have been abandoned. Conventional scrubbing methods represented by passing the vapors through water sprays are unsatisfactory.

According to my invention, vapor absorption is improved and efficient chemical deodorization of the vapors is effected by circulating a stream of water in a confined or partially closed system, advantageously satisfying the chlorine demand of the water stream by addition of chlorine, intimately contacting the process vapors with the circulating water stream and treating the circulating water stream with chlorine dioxide in order to oxidize the organic vapors and provide a safe residual chlorine content. For example, a water stream is drawn from a reservoir or supply tank and vapors, evolved in processing or collected from the plant atmosphere, are passed through a collecting duct system and are injected into the flowing stream of water. A mixing or contacting system is provided that will insure intimate vapor-water contact, and the stream of water with entrained or absorbed vapors is returned to the supply tank. The water stream is treated with chlorine dioxide in order to react with the vapors in the water medium. The chlorine dioxide may be added to the water stream just before the point of vapor injection or contacting, or the chlorine dioxide may be added to the water stream containing the absorbed vapors, for example in the supply tank. The quantity of chlorine dioxide required to effect the chemical deodorization advantageously is reduced by first satisfying the chlorine demand of the water stream with a less expensive chlorine chemical before adding chlorine dioxide. Chlorine gas or calcium hypochorite may be used for this purpose. It is important, however, to accomplish the primary deodorization by chemical reaction with chlorine dioxide because I have found that odor reduction is much more effective when the odor is oxidized rather than chlorinated. An oxidized odor is not offensive while a chlorinated or reduced odor generally is. It is advantageous to maintain the circulating water stream at an alkaline pH throughout the treatment.

The process of my invention is highly successful in practical application for a number of reasons. As indicated above, it provides a system in which prolonged and intimate contact of vapors and water are obtained. The odor vapors then are largely treated in the liquid aqueous medium. The reaction is more effective and goes more substantially to completion. Moreover, as indicated above, oxidation is much more effective than chlorination in deodorization. Treatment with chlorine dioxide also has the advantage that chlorine dioxide has a high oxidation potential in an alkaline medium. In organic processing such as in the splitting or rendering of fats, substantial amounts of ammonia are given off as a protein degradation product. In chlorination the presence of the ammonia appreciably reduces the chlorine residual by reaction of the ammonia with the chlorine to form chloramines. For this reason and because it is only at the lower pH values, e. g. between about pH 4 and pH 7, that chlorine has its best effects in destroying odors, the water would have to be acidified which contributes to the cost of treatment and creates corrosion problems. Indeed, the use of chlorine itself results in a much greater lowering of pH as compared to the use of chlorine dioxide. With chlorine dioxide treatment the presence of the ammonia is an advantage in putting the pH of the aqueous absorption medium on the alkaline side. In any event, the pH advantageously is adjusted to about pH 8 to pH 10.

The process of my invention is valuable in reducing the amount of cooling water that must be employed in contacting the odor vapors evolved from an organic processing plant. Thus it is well known that the temperature of the water contacting medium is an important factor in reducing atmospheric pollution from cooking odors by chlorination. As long as the water temperature is kept down to about 85° F. odor absorption and reaction with chlorine may be fairly satisfactory. When the water temperature reaches 90° F. or over, atmospheric pollution rapidly becomes worse. For example, in a fat rendering plant in the city of Syracuse, New York, the plant had to draw excessive quantities of fresh water in the summer from the city mains into the water contacting system for cooling purposes. It was the experience of this plant that when the fresh water supply was cut off rapid temperature rise occurred, and atmospheric pollution became intolerable as was shown by the volume of public complaints and the reaction of the City Health Department. The use of the necessary quantities of fresh water from the city mains however, was strictly an emergency matter since the city of Syracuse could not supply this quantity of water to this one plant indefinitely, nor could the plant afford to buy so much extra water per day. In operation according to my invention, the intimate and prolonged contacting and the chlorine dioxide treatment prevent atmospheric pollution of the surrounding neighborhood with water temperatures as high as 100° F. or more.

My invention will be further described with reference to the accompanying drawing which illustrates diagrammatically the general plan of treatment with certain alternative handling procedures. My invention however is not limited to the specific procedure shown but may be flexibly adapted to the handling of concentrated vapor streams off the process equipment or to the handling of atmospheric vapors collected from the processing and raw stock handling rooms of the plant.

In the drawing, a typical basement supply tank 10 of about 10,000 gallons capacity is shown. A water stream from the tank 10 is drawn by pump 11 through line 12 to water manifold 13 on the roof of the building. The water passes from manifold 13 into the vertical arms 14 of two suction T's 15. The water injection pipes 16 are tapered at the discharge end to form an aspirator. Vapors from fat cookers 17 are collected in a duct system 18 and by means of blower 19 and lines 20 and 20a are injected into the side arms of each of suction T's 15. The vapors are intimately admixed with the water stream by reason of the aspirating action of water inlet pipes 16, and the water streams containing the absorbed or entrained vapors pass down through pipes 21 for discharge into tank 10 by means of submerged lines 22. By way of example water injection pipes 16 may be 4-inch lines tapering to 2-inches at the discharge point, and the suction T's are of 6-inch diameter construction.

Sufficient chlorine is added through line 23 to the water entering the tank 10 through line 43 to maintain a chlorine residual of about 10 p. p. m. in the tank water. The chlorine addition may be direct to the tank, that is by line 25. Chlorine dioxide is generated with the usual equipment. As shown, sodium chlorite solution is made up in a 30-gallon mixing crock 26. A 24-hour supply for the illustrative system is made up by dissolving technical sodium chlorite in 30 gallons of water. The chlorine dioxide is generated by feeding the sodium chlorite solution to mixing chamber 27 by means of proportioning pump 28 and line 29 at the rate of about 1 gallon per hour and feeding chlorine gas through line 30 at a rate in slight excess of that necessary to complete the following reaction:

$$2NaClO_2 + Cl_2 = 2ClO_2 + 2NaCl$$

The chlorine dioxide also can be generated by activation of the sodium chlorite solution with a solution of a hypochlorite in the presence of acid. The chlorine dioxide generation procedure and equipment are conventional.

The chlorine dioxide advantageously is added to the ends of water manifold 13 through line 31 just before the water stream is injected into the suction T's 15. Alternatively the chlorine dioxide can be added after the vapor-water contacting stage as by treating the water in tank 10 by addition of chlorine dioxide through line 32. Sufficient chlorine dioxide is employed to give a safe chlorine residual in the treated water, e. g. about 10 to 15 p. p. m. Chlorine residual in water containing chlorine, chloramine and chlorine dioxide can be tested by the known orthotolidene arsenite oxalic acid test in which sodium arsenite destroys chloramine and oxalic acid destroys free chlorine without affecting the chlorine dioxide.

In the procedure illustrated in the drawing, vapors collecting in tank 10 are vented through line 33 to the plant main ventilating system 34. Atmospheric odors within the plant's working rooms are collected in system 34 as at 36, and the gas stream is blown by fan 37 through water cascade system 38. A series of spray heads or grids are employed in the water cascade system 38 set at angles in order to provide effective countercurrent washing action on the vapor stream. Water entering the water line 39 may draw from the tank 10 or may draw in whole or in part on fresh water. Chlorine through line 40 supplemented by chlorine dioxide through line 41 may be injected into water line 39. Water from the water cascade system 38 is collected in pond 42 which drains through line 43 back into tank 10. Sewer line 44 is provided from tank 10 to run water to the sewer as desired.

I claim:

The method of controlling the odors of vapors evolved in the processing of organic materials which comprises forming a stream of water at a temperature of at least about 90° F. and an alkaline pH of about 8–10, adding sufficient chlorine dioxide to provide a chlorine residual of at least 10 p. p. m., and intimately contacting the process vapors with said warm, alkaline, chlorine dioxide containing water.

References Cited in the file of this patent

UNITED STATES PATENTS

| | | |
|---|---|---|
| 136,129 | Broadnax | Feb. 25, 1873 |
| 1,410,249 | Henderson et al. | Mar. 21, 1922 |
| 1,799,177 | Perry | Apr. 7, 1931 |
| 1,854,428 | Segerfelt | Apr. 19, 1932 |
| 2,557,451 | Merrick | June 19, 1951 |

OTHER REFERENCES

Vincent et al.: Article in "Jour. of Chem. Ed.," pages 283–285, June 1945.

Mellor: "Comprehensive Treatise on Inorganic and Theoretical Chem.," page 289, vol. 2, Longmans, Green and Co., N. Y.